United States Patent
Pal et al.

(10) Patent No.: US 8,350,753 B2
(45) Date of Patent: Jan. 8, 2013

(54) METHODS AND SYSTEMS FOR DISPLAYING AN OBJECT HAVING AN ASSOCIATED BEACON SIGNAL

(75) Inventors: Subhadeep Pal, Karnataka (IN); Sharad Rathour, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 774 days.

(21) Appl. No.: 12/371,805

(22) Filed: Feb. 16, 2009

(65) Prior Publication Data
US 2010/0207845 A1  Aug. 19, 2010

(51) Int. Cl.
*G01S 1/08* (2006.01)
(52) U.S. Cl. .............. 342/182; 342/44; 342/46
(58) Field of Classification Search .......... 342/182
See application file for complete search history.

(56) References Cited

U.S. PATENT DOCUMENTS

| | | | |
|---|---|---|---|
| 3,750,166 A | 7/1973 | Dearth | |
| 4,293,857 A * | 10/1981 | Baldwin | 342/32 |
| 4,510,497 A * | 4/1985 | Onozawa | 342/51 |
| 4,547,778 A | 10/1985 | Hinkle et al. | |
| 5,724,045 A | 3/1998 | Kawakami | |
| 6,275,164 B1 * | 8/2001 | MacConnell et al. | 340/692 |
| 6,317,049 B1 * | 11/2001 | Toubia et al. | 340/573.4 |
| 6,658,349 B2 | 12/2003 | Cline | |
| 6,670,920 B1 * | 12/2003 | Herrick | 342/378 |
| 6,708,090 B2 | 3/2004 | Staggs | |
| 6,771,969 B1 | 8/2004 | Chinoy et al. | |
| 6,853,302 B2 * | 2/2005 | Monroe | 340/573.1 |
| 6,943,700 B2 | 9/2005 | Ceccom et al. | |
| 6,992,626 B2 | 1/2006 | Smith | |
| 7,003,278 B2 * | 2/2006 | Beni et al. | 455/404.1 |
| 7,123,192 B2 | 10/2006 | Smith et al. | |
| 7,239,264 B2 * | 7/2007 | Cherniakov | 342/51 |
| 7,312,725 B2 | 12/2007 | Berson et al. | |
| 7,352,292 B2 | 4/2008 | Alter et al. | |
| 7,400,249 B2 * | 7/2008 | Monroe | 340/572.1 |
| 7,420,501 B2 | 9/2008 | Perl | |
| 7,440,427 B1 * | 10/2008 | Katz | 370/321 |
| 7,495,562 B2 * | 2/2009 | Monroe | 340/572.1 |
| 7,564,404 B2 * | 7/2009 | Katz | 342/357.31 |
| 7,830,305 B2 * | 11/2010 | Boling et al. | 342/357.55 |
| 8,010,282 B2 * | 8/2011 | Barry et al. | 705/20 |
| 8,106,753 B2 * | 1/2012 | Vian et al. | 340/438 |
| 2007/0018887 A1 * | 1/2007 | Feyereisen et al. | 342/176 |
| 2007/0219677 A1 * | 9/2007 | Winkler et al. | 701/3 |
| 2007/0297696 A1 | 12/2007 | Hamza et al. | |
| 2008/0024365 A1 * | 1/2008 | Holmes et al. | 342/418 |
| 2008/0039985 A1 | 2/2008 | Peyrucain et al. | |
| 2008/0158256 A1 | 7/2008 | Russell et al. | |
| 2009/0209227 A1 * | 8/2009 | Greer et al. | 455/404.2 |

* cited by examiner

*Primary Examiner* — John B Sotomayor
*Assistant Examiner* — Matthew M Barker
(74) *Attorney, Agent, or Firm* — Ingrassia Fisher & Lorenz, P.C.

(57) ABSTRACT

Systems and methods are provided for displaying information on a display device associated with an aircraft. A method comprises rendering a synthetic perspective view of terrain on the display device, wherein the synthetic perspective view of terrain is based on a set of terrain data corresponding to a region proximate the aircraft. The method further comprises obtaining location data for a first object, wherein the location data is based at least in part on a beacon signal associated with the first object, and rendering a graphical representation of the first object on the display device. The graphical representation of the first object overlies the synthetic perspective view of terrain and is positioned in accordance with the location data.

21 Claims, 4 Drawing Sheets

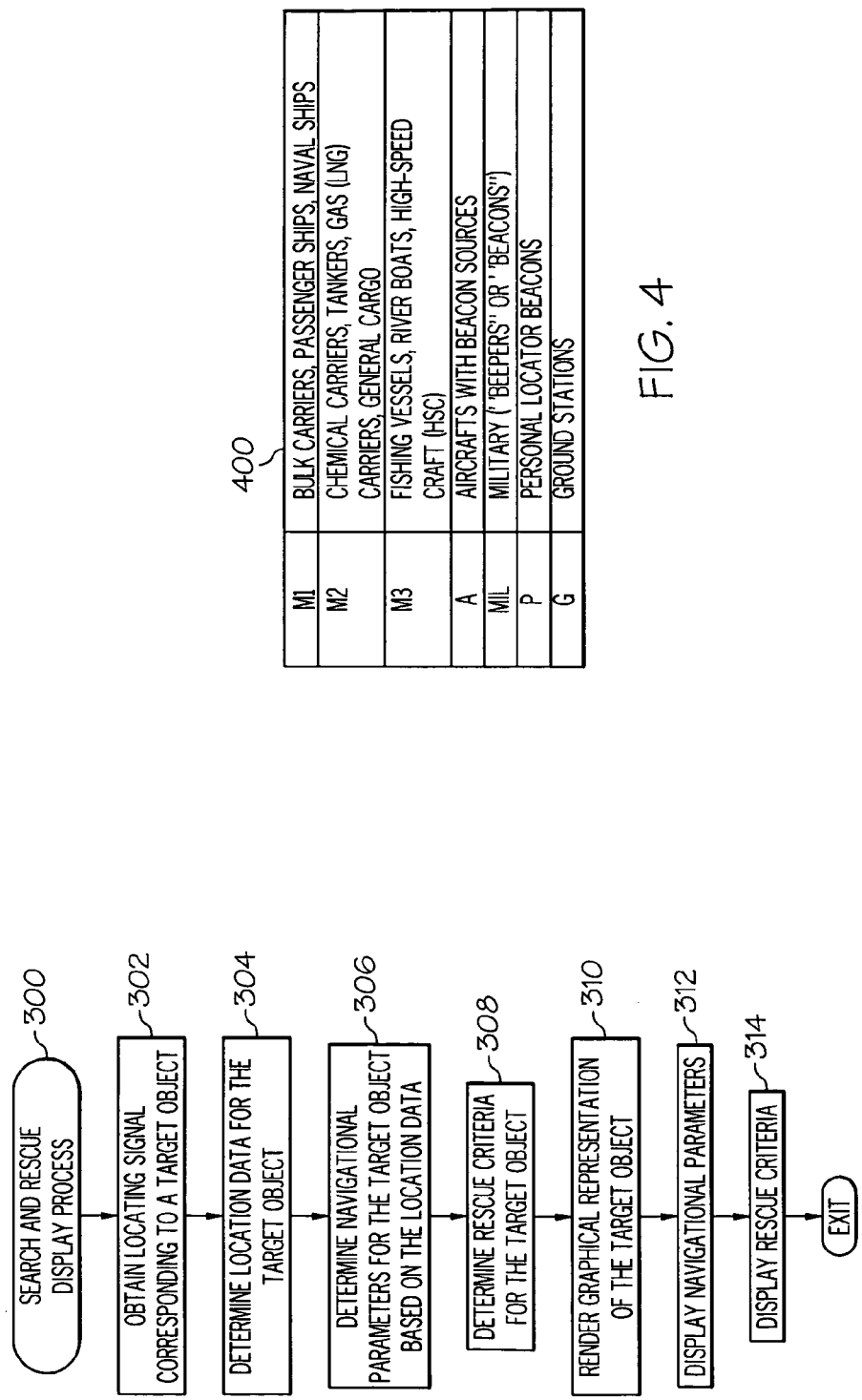

METHODS AND SYSTEMS FOR DISPLAYING AN OBJECT HAVING AN ASSOCIATED BEACON SIGNAL

TECHNICAL FIELD

The subject matter described herein relates generally to avionics systems, and more particularly, embodiments of the subject matter relate to cockpit display systems adapted for displaying objects associated with a beacon configured to emit a signal.

BACKGROUND

Modern flight deck displays (or cockpit displays) for vehicles (such as aircraft or spacecraft) display a considerable amount of information, such as vehicle position, speed, altitude, attitude, navigation, target, and terrain information. In the case of an aircraft, most modern displays additionally display a flight plan from different views, either a lateral view, a vertical view, or a perspective view, which can be displayed individually or simultaneously on the same display.

The lateral view, generally known as a lateral map display, is basically a top-view of the flight plan, and may include, for example, a top-view aircraft symbol, waypoint symbols, line segments that interconnect the waypoint symbols, and range rings. The lateral map may also include various map features including, for example, weather information, terrain information, political boundaries, and navigation aids. The terrain information may include situational awareness (SA) terrain, as well as terrain cautions and warnings which, among other things, may indicate terrain that may obstruct the current flight path of the aircraft. The perspective view provides a three-dimensional view of the vehicle flight plan and may include one or more of the above-mentioned features that are displayed on the lateral map, including the terrain information. In this regard, some modern flight deck display systems incorporate a synthetic terrain display, which generally represents a virtual or computer simulated view of terrain rendered in a conformal manner. The primary perspective view used in existing synthetic vision systems emulates a forward-looking cockpit viewpoint. Such a view is intuitive and provides helpful visual information to the pilot and crew.

Often, such aircraft are utilized when performing search and rescue (SAR) operations in conjunction with a beacon-based SAR system. Most beacon-based SAR systems utilize a beacon (e.g., a distress radio beacon or locator beacon), which is a transmitter associated with a person, vehicle, or vessel. In an emergency situation, the beacon is activated, which causes the beacon to emit a beacon signal that is received by one or more satellites in a satellite system. The satellite system processes the beacon signal(s) and determines the approximate real-world location of the beacon (e.g., via triangulation, trilateration, global positioning system (GPS) techniques, and the like). The location of the beacon is provided to the aircraft, which then utilizes this location when attempting to locate the person, vehicle, or vessel.

In many situations, SAR operations are performed in inaccessible or remote locations, for example, in marine environments (e.g., over open ocean) or alpine environments (e.g., mountainous locations). In these various locations, a SAR aircraft might encounter rough weather conditions, such as, high winds, clouds, precipitation, and/or low visibility. This increases the difficulty on behalf of the pilot and/or crew to safely operate the aircraft while simultaneously attempting to locate the source of the beacon signal(s) (e.g., a person or vehicle). In addition, pilot and/or crew are often operating the aircraft at a reduced flight level during SAR operations, which further increases the demands on the pilot and/or crew. In these situations, the three-dimensional perspective view used in existing synthetic vision systems aids the pilot in safely navigating and operating the aircraft to avoid terrain and/or obstacles, however, the pilot and/or crew are still left with the task of manually navigating to the identified location and locating the source of the beacon signal(s).

BRIEF SUMMARY

A method is provided for displaying information on a display device associated with an aircraft. The method comprises rendering a synthetic perspective view of terrain on the display device, wherein the synthetic perspective view of terrain is based on a set of terrain data corresponding to a region proximate the aircraft. The method further comprises obtaining location data for a first object, wherein the location data is based at least in part on a beacon signal associated with the first object, and rendering a graphical representation of the first object on the display device. The graphical representation of the first object overlies the synthetic perspective view of terrain and is positioned in accordance with the location data.

In another embodiment, a method is provided for displaying information on a display device associated with an aircraft. The method comprises rendering a primary flight display on the display device, wherein the primary flight display comprises a synthetic perspective view of terrain for a region proximate a current location of the aircraft, and wherein the synthetic perspective view of terrain corresponds to a flight deck viewpoint. The method further comprises receiving a locating signal for a target object and, in response to the locating signal, rendering, in a portion of the primary flight display, a first symbology representative of the target object, wherein the first symbology is rendered in a manner that is influenced by the locating signal.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements.

FIG. 3 is a flow diagram of an exemplary search and rescue display process suitable for use with the display system of FIG. 1 and the flight deck display of FIG. 2 in accordance with one embodiment;

FIG. 4 is a table of an exemplary classification scheme for an object suitable for use with the search and rescue display process of FIG. 3.

DETAILED DESCRIPTION

Figure 1:
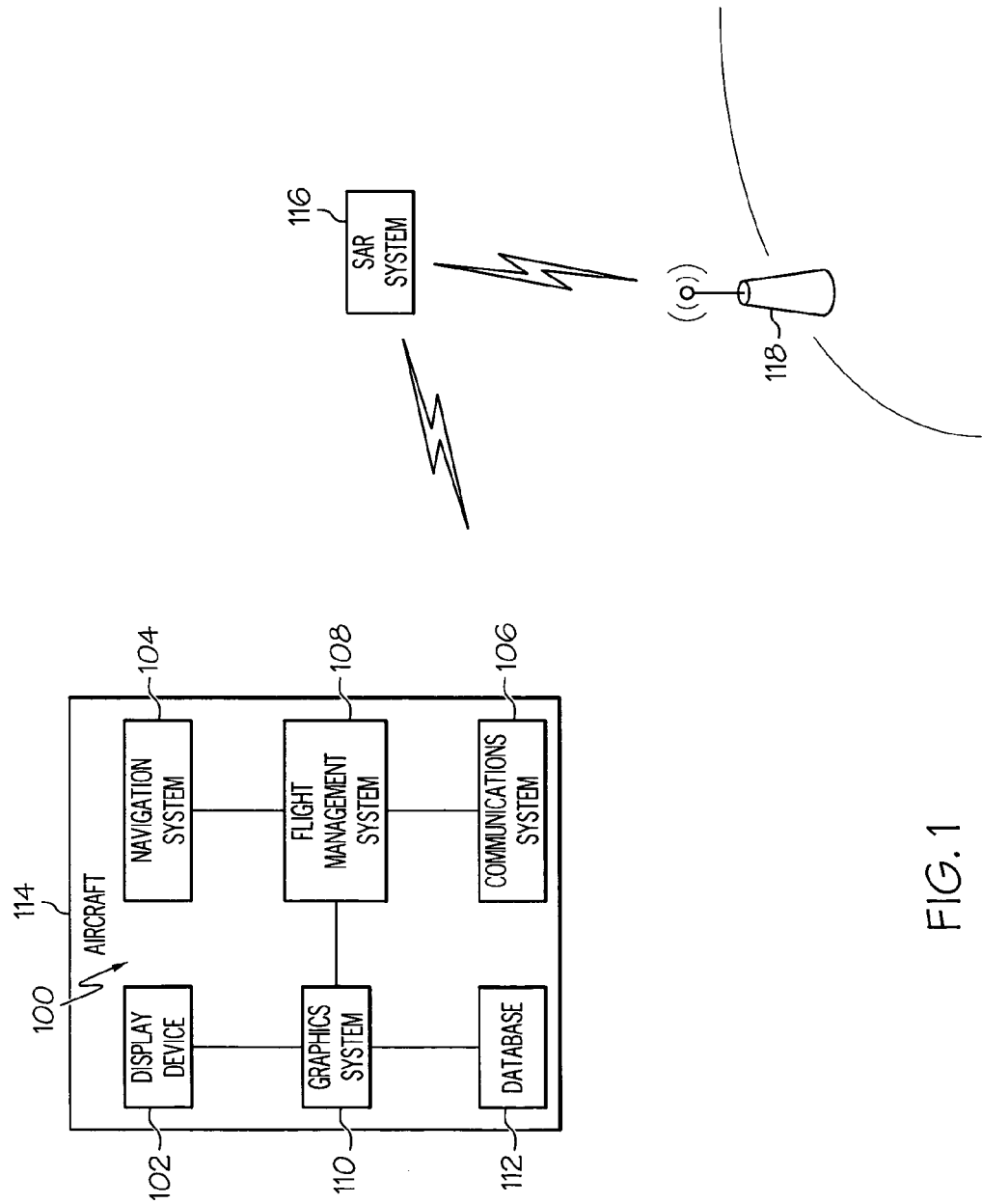
FIG. 1 is a block diagram of a display system suitable for use in an aircraft in accordance with one embodiment.

The following detailed description is merely exemplary in nature and is not intended to limit the subject matter of the application and uses thereof. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, the terms "first", "second" and other such numerical terms referring to structures do not imply a sequence or order unless clearly indicated by the context For the sake of brevity, conventional techniques related to graphics and image processing, navigation, flight planning, aircraft controls, distress radio beacons or locator beacons, satellite-based search and rescue (SAR) systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to display systems adapted for displaying, on a display device associated with an aircraft, a graphical representation of a targeted object overlying a synthetic perspective view of terrain for a region proximate the aircraft in response to receiving a locating signal associated with the targeted object. In an exemplary embodiment, the targeted object is rendered and/or displayed in a conformal manner overlying a three-dimensional perspective view of terrain in a primary flight display. The target object may thereby be presented in a manner that enhances the situational awareness and thereby improving SAR operations in situations involving rough weather, poor visibility, and/or rugged terrain. Navigational parameters for the target object may be determined relative to the current location and/or heading of the aircraft and displayed proximate the graphical representation of the target object to provide further assistance in locating the target object. In addition, various rescue related criteria may be identified and utilized to influence rendering of the target object, allowing relevant information to be presented in a quick and intuitive manner.

FIG. 1 depicts an exemplary embodiment of a display system 100, which may be located onboard an aircraft 114. In an exemplary embodiment, the aircraft 114 is suitable for performing SAR operations in maritime and/or terrestrial environments. This embodiment of display system 100 may include, without limitation, a display device 102, a navigation system 104, a communications system 106, a flight management system 108 (FMS), and a graphics system 110. The display system 100 further includes one or more databases 112 suitably configured to support operation of the display system 100, as described in greater detail below. It should be understood that FIG. 1 is a simplified representation of a display system 100 for purposes of explanation and ease of description, and FIG. 1 is not intended to limit the application or scope of the subject matter in any way. In practice, the display system 100 and/or aircraft 114 will include numerous other devices and components for providing additional functions and features, as will be appreciated in the art.

In an exemplary embodiment, the display device 102 is coupled to the graphics system 110. The graphics system 110 is coupled to the flight management system 108, and the flight management system 108 and the graphics system 110 are cooperatively configured to display, render, or otherwise convey one or more graphical representations or images associated with operation of the aircraft 114 on the display device 102, as described in greater detail below. The flight management system 108 is coupled to the navigation system 104 for obtaining real-time navigational data and/or information regarding operation of the aircraft 114 to support operation of the flight management system 108. In an exemplary embodiment, the communications system 106 is coupled to the flight management system 108 and configured to support communications between the aircraft 114 and a beacon-based SAR system 116, as described in greater detail below.

In an exemplary embodiment, the display device 102 is realized as an electronic display configured to graphically display flight information or other data associated with operation of the aircraft 114 under control of the graphics system 110. In an exemplary embodiment, the display device 102 is located within a cockpit of the aircraft 114. It will be appreciated that although FIG. 1 shows a single display device 102, in practice, additional display devices may be present onboard the aircraft 114. It should be appreciated that although FIG. 1 shows the display device 102 within the aircraft 114, in practice, the display device 102 may be located outside the aircraft 114 (e.g., on the ground as part of an air traffic control center or another command center) and communicatively coupled to the remaining elements of the display system 100 (e.g., via a data link).

In an exemplary embodiment, the navigation system 104 is configured to obtain one or more navigational parameters associated with operation of the aircraft 114. The navigation system 104 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 and the flight management system 108 are cooperatively configured to obtain and/or determine the current location of the aircraft 114 (e.g., the latitude and longitude) and the heading of the aircraft 114 (i.e., the direction the aircraft is traveling in relative to some reference) during operation of the aircraft 114.

In an exemplary embodiment, the communications system 106 is suitably configured to support communications between the aircraft 114 and a beacon-based SAR system 116. In this regard, a beacon-based SAR system 116 should be understood as referring to a system or network that utilizes a beacon 118 (e.g., a distress radio beacon or locator beacon) to locate an object (e.g., a person, vehicle, vessel, aircraft, or another suitable object) that is indicating a desire to be located, rescued, or receive some other type of attention (e.g., the object is in distress or otherwise experiencing a state of emergency). In this regard, the beacon 118 is realized as a transmitter associated with a particular person (e.g., a personal locator beacon or PLB), aircraft (e.g., an emergency locator transmitter or ELT), vessel (e.g., an emergency position-indicating radio beacon or EPIRB), or another vehicle or object. When activated (either manually or automatically), the beacon 118 emits a beacon signal which is utilized to determine the approximate real-world location of the beacon 118 and thereby locate the object associated with the beacon 118, as described in greater detail below. In an exemplary embodiment, the beacon 118 emits a beacon signal comprising a burst of digital information at 406 MHz, although in alternative embodiments, the beacon 118 may emit an analog beacon signal or emit a beacon signal having a different frequency, such as, for example, 121.5 MHz, 243 MHz, or another suitable frequency. In an exemplary embodiment, the beacon 118 has a unique identifier (referred to herein as the beacon identifier) which is utilized to establish an association between the beacon 118 (or beacon signal) and the object associated with the beacon 118. For example, the beacon identifier may comprise a unique hexadecimal identification code, a maritime mobile service identity (MMSI) code, an international civil aviation organization (ICAO) code, or the like that may be used to identify the object associated with the beacon 118. Various aspects of beacon-based SAR systems are well known and so, in the interest of brevity, will only be mentioned briefly herein or will be omitted entirely without providing the well known details.

As shown, in an exemplary embodiment, the communications system 106 communicates with a satellite-based SAR system 116, such as, for example, Cospas-Sarsat, which is configured to receive one or more beacon signals from the beacon 118. In this regard, the satellite-based SAR system 116 may include a plurality of satellites, signal processing stations, mission control centers and/or rescue coordination centers. For example, one or more satellites of the plurality of satellites may receive a beacon signal from the beacon 118, and communicate the beacon signal (or the information embodied by or derived from the beacon signal) to one or more ground based signal processing stations (or ground terminals). The ground stations may calculate and/or determine the approximate location of the beacon 118 (e.g., via triangulation, trilateration, GPS techniques, and the like). In an exemplary embodiment, SAR system 116 also identifies the object associated with the beacon 118 using the beacon identifier. For example, to register the beacon 118 with the SAR system 116, in addition to a unique hexadecimal identification code, the beacon may also be registered with information pertaining to the type of vehicle (or object), a vehicle (or object) identifier (e.g., the name, call sign, MMSI, or an identification number), along with information pertaining to the owner of the beacon 118 (or the associated vehicle or object) and emergency contact information. In this regard, in an exemplary embodiment, the SAR system 116 includes a registration database that maintains the association between the beacon identifier and the type and/or identity of the object or vehicle.

In an exemplary embodiment, a mission control center and/or rescue coordination center receives the data and/or information from the satellites and/or ground stations, and in response, communicates a locating signal that comprises the information derived from the received beacon signals (e.g., the approximate real-world location of the beacon 118 and/or the identity of the object based on the beacon identifier) to the aircraft 114 for conducting a SAR operation, as described in greater detail below. It should be appreciated in the art that although FIG. 1 illustrates the communications system 106 receiving the locating signal (or the information embodied in the one or more received beacon signals) via the SAR system 116, in some embodiments, the communications system 106 and/or display system 100 may be adapted to receive a beacon signal directly from the beacon 118, wherein the aircraft 114 and/or flight management system 108 may also include a registration database that maintains the association between the beacon identifier and the type and/or identity of the object or vehicle.

Figure 2:
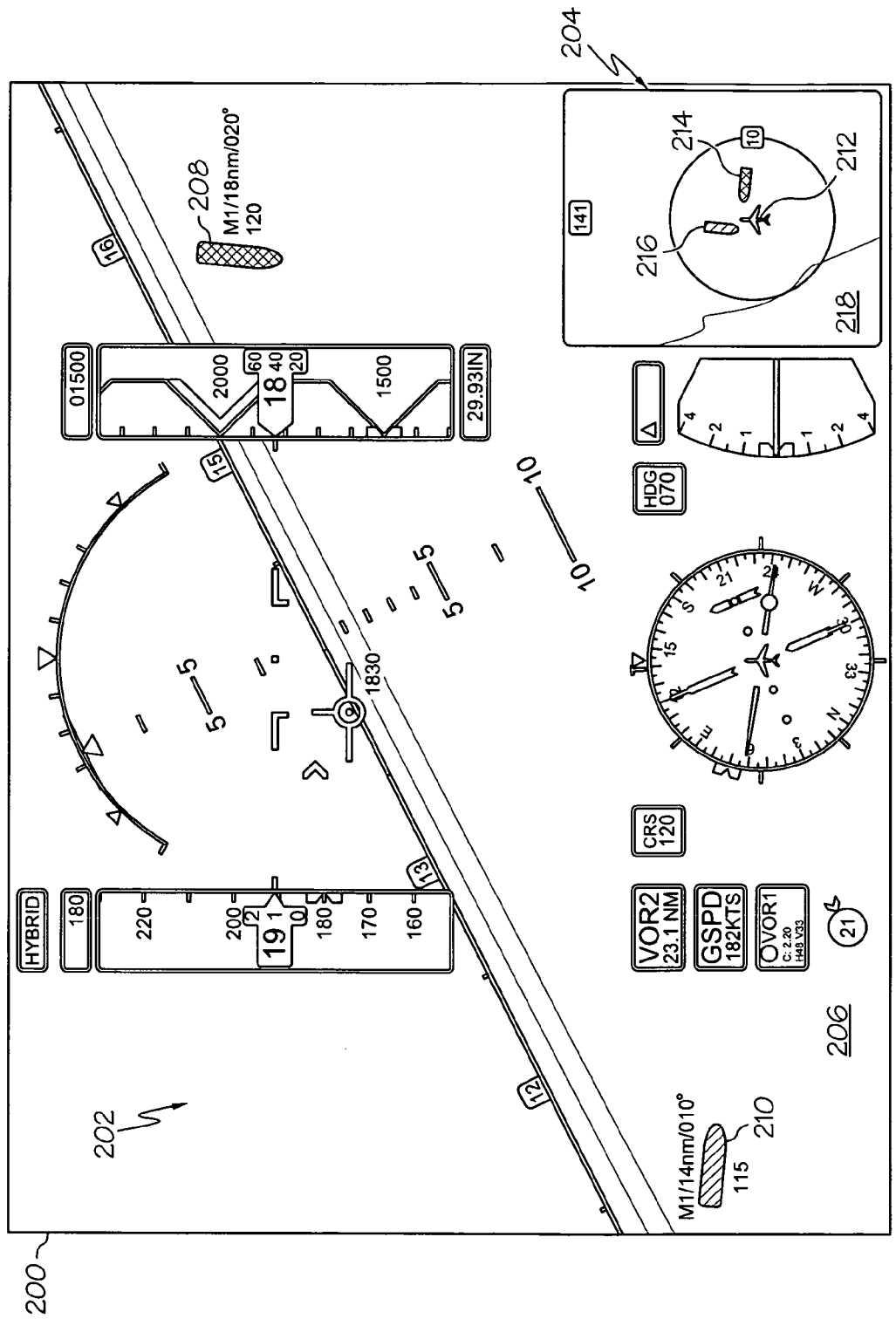
FIG. 2 is an exemplary flight deck display, including a synthetic perspective view of an object, suitable for use with the search and rescue display process of FIG. 3 in accordance with one embodiment.

Referring now to FIG. 2, and with continued reference to FIG. 1, in an exemplary embodiment, the flight management system 108 and the graphics system 110 are cooperatively configured to control the rendering of a flight deck display 200 on the display device 102. As shown in FIG. 2, in an exemplary embodiment, the flight deck display 200 includes a primary flight display 202 and a lateral map display 204. The combination of the synthetic perspective view of primary flight display 202 and lateral map display 204 provides useful and intuitive information to the flight crew in a simple graphical manner, as will be appreciated in the art and described in greater detail below.

In the illustrated embodiment, the primary flight display 202 and the lateral map display 204 represent defined sections or windows rendered on a single display device (e.g., display device 102), with the lateral map display 204 overlying a portion of the primary flight display 202. In other embodiments, the primary flight display 202 and the lateral map display 204 can be rendered on one or more physically distinct display devices. Although not a requirement, the general positioning, size, boundaries, and orientation of primary flight display 202 and lateral map display 204 within flight deck display 200 remain fixed during operation. It should be appreciated that flight deck display 200 as depicted in FIG. 2 represents the state of a dynamic display frozen at one particular time, and that the flight deck display 200 may be continuously refreshed during operation of the aircraft 114.

In the illustrated embodiment, primary flight display 202 includes several features that are graphically rendered, including, without limitation a synthetic perspective view of terrain 206 and a graphical representation of one or more objects 208, 210, each object 208, 210 being associated with a locating signal received and/or obtained by the aircraft, as described in greater detail below. For the sake of clarity, simplicity, and brevity, the additional graphical elements of the primary flight display 202 (e.g., pilot guidance elements, altimeters, airspeed indicators, and the like) will not be described herein. As described in greater detail below, the objects 208, 210 comprise symbology representative of the type of object associated with the respective locating signal. In this regard, the each object 208, 210 is positioned within the primary flight display 202 overlying the terrain 206 in a manner that accurately reflects the approximate real-world location of the object 208, 210 based on one or more beacon signals emitted by and/or received from a beacon associated the object 208, 210, as described in greater detail below.

In an exemplary embodiment, the terrain 206 is based on a set of terrain data that corresponds to a region proximate the current location of aircraft. In this regard, the graphics system 110 includes or otherwise accesses one or more databases 112, and in conjunction with navigational information from flight management system 108 and/or navigation system 104, the graphics system 110 controls the rendering of the terrain 206 on the display device 102 and updates the set of terrain data being used for rendering as needed as the aircraft 114 travels. In this regard, the display system 100 includes one more databases 112 to rendering of the flight deck display 200 including, for example, a terrain database, a geopolitical database, a navigational aid (or NAVAID) database, an obstacle database, a marine database, or another other suitable commercial or military database. In addition, in some embodiments, the graphics system 110 may be coupled to one or more sensors (or sensor systems) and adapted to utilize real-time sensor data (e.g., infrared imagery) to augment the data used in rendering the terrain 206 or otherwise enhance the situational awareness and/or accuracy of the primary flight display 202 (e.g., an enhanced synthetic-vision system).

As shown, in an exemplary embodiment, the graphics system 110 is configured to render the terrain 206 in a perspective or three dimensional view that corresponds to a flight deck (cockpit) viewpoint. In other words, terrain 206 is displayed in a graphical manner that simulates a flight deck viewpoint, that is, the vantage point of a person in the cockpit of the aircraft. Thus, features of terrain 206 are displayed in a conformal manner, relative to the earth. For example, the relative elevations and altitudes of features in terrain 206 are displayed in a virtual manner that emulates reality. Moreover, as the aircraft navigates (e.g., turns, ascends, descends, rolls, etc.), the graphical representation of terrain 206 and other features of the perspective display can shift to provide a continuously updated virtual representation for the flight crew. It should be appreciated that although the perspective view associated with primary flight display 202 need not always include a perspective view of terrain 206. For example, in the absence of terrain data, the perspective view of the display may appear flat, blank, or otherwise void of conformal terrain graphics.

In an exemplary embodiment, the lateral map display 204 is concurrently rendered with primary flight display 202, preferably in a real-time and synchronized manner. The illustrated lateral map display 204 includes a top-view aircraft symbol 212 and top-view graphical representations 214, 216 of the one or more objects 208, 210. For the sake of clarity, simplicity, and brevity, the additional graphical elements of the lateral map display 204 will not be described herein. Lateral map display 204 also preferably includes various map features including, but not limited to, a lateral two-dimensional view of terrain 218 corresponding to a region proximate the current location of aircraft. The depicted state of the lateral map display 204 corresponds to the depicted state of the primary flight display 202. In other words, the terrain 218 and objects 214, 216 are positioned relative to the aircraft symbol 212 in a manner corresponding to the depiction of the terrain 206 and objects 208, 210 relative to the flight-deck viewpoint for the aircraft 114. In a similar manner as described above, each object 214, 216 is positioned within the lateral map display 204 overlying the terrain 218 in a manner that reflects the approximate real-world location of the object 214, 216 based on one or more beacon signals emitted by and/or received from the respective beacon associated with the object 214, 216, as described in greater detail below.

Referring now to FIG. 3, in an exemplary embodiment, a display system 100 may be configured to perform a search and rescue display process 300 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the navigation system 104, the communications system 106, the flight management system 108, the graphics system 110, or the database 112. It should be appreciated that any number of additional or alternative tasks may be included, and may be incorporated into a more comprehensive procedure or process having additional functionality not described in detail herein.

Referring again to FIG. 3, and with continued reference to FIG. 1 and FIG. 2, a SAR display process 300 may be performed to display or present symbology representative of an object associated with a radio beacon (or locator beacon) on a display device in order to enable an aircraft operator to carry out an SAR operation with improved situational awareness. In an exemplary embodiment, the SAR display process 300 initializes or begins by obtaining a locating signal corresponding to a target object (task 302). As used herein, a target object should be understood as an object (e.g., a vehicle, vessel, person, building) associated with a beacon (e.g., beacon 118) that has previously emitted (or is currently emitting) a beacon signal indicative of a desire to be located, rescued, or receive some other type of attention. In this regard, a locating signal represents a signal obtained and/or received by the aircraft that may be utilized to identify and/or determine the approximate real-world location (or position) of the source of the one or more beacon signals, that is, the location of the beacon associated with the target object, and hence, the location of the target object. In this manner, the locating signal contains information embodied by and/or derived from the one or more beacon signals emitted by and/or received from a beacon associated with the target object. For example, referring to FIG. 2, in accordance with one embodiment, a beacon onboard a first vessel 208 may emit one or more beacon signals which are received by an SAR system (e.g., SAR system 116). The SAR system 116 processes the received beacon signals to obtain a locating signal, which is then transmitted by the SAR system 116 and received by the aircraft 114. In an exemplary embodiment, the locating signal also comprises identification information for the target object based on a beacon identifier obtained from a beacon signal. In this regard, the identification information includes information related to the object associated with the beacon emitting the beacon signals that may be used to identify one or more rescue criteria for the target object, such as, for example, the name and/or identity of the target object and/or the object type, as described in greater detail below.

In an exemplary embodiment, the SAR display process 300 continues by determining or otherwise obtaining location data for the target object (task 304). In this regard, location data comprises data and/or information (e.g., latitude and longitude, GPS coordinates, and the like) used to identify the approximate real-world location or position of the source of the beacon signal(s) (e.g., the beacon associated with the target object) embodied by the locating signal. In accordance with one embodiment, the location data may be calculated by the SAR system 116 and encapsulated or otherwise contained within the locating signal. For example, the SAR system 116 may calculate the location of the target object by performing triangulation on a plurality of beacon signals received by a plurality of satellites. In this manner, the aircraft 114 may determine and/or identify location data for the target object based on the contents of the locating signal obtained from the SAR system 116. In another embodiment, the locating signal may contain information derived from one or more beacon signals, wherein the aircraft 114 calculates and/or determines the location data for the target object based on the locating signal.

Referring again to FIG. 3, in an exemplary embodiment, the SAR display process 300 continues by determining and/or calculating navigational parameters for the target object (task 306). In this regard, navigational parameters refer to parameters or information relevant to searching for the target object and/or navigating the aircraft to the approximate real-world location of the target object. For example, in accordance with one embodiment, the SAR display process 300 obtains the current location of the aircraft (e.g., via navigation system 104 and/or flight management system 108) and determines the distance between the location of the object and the current location of the aircraft. In another embodiment, the SAR display process 300 determines the bearing for navigating to the location of the target object. In this regard, the SAR display process 300 may obtain the current heading of the aircraft (e.g., via navigation system 104 and/or flight management system 108) and calculate the bearing for the object location relative to the current heading of the aircraft based on the direction from the current location of the aircraft to the object location. As described in greater detail below, the navigational parameters may be displayed on the display device, thereby assisting the pilot and/or crew in locating the target object.

In an exemplary embodiment, the SAR display process 300 continues by determining and/or identifying rescue criteria for the target object (task 308). In this regard, the rescue criteria represent information pertaining one or more categories deemed relevant to conducting the SAR operation, such as, for example, the object type of the target object, the number of persons associated with the target object, the type and/or amount of cargo associated with the target object, and/or geographic data (e.g., altitude or sea level depth) at or near the location of the target object. As described in greater detail below, in an exemplary embodiment, the SAR display process 300 may be adapted to display the identified rescue criteria on the display device and/or render a graphical representation of the target object in a manner that is influenced by the identified rescue criteria.

In accordance with one embodiment, the SAR display process 300 may identify an object type for the target object based on the locating signal (e.g., based on the associated beacon identifier). For example, as described above, the SAR system 116 and/or aircraft 114 includes a registration database that maintains the association between a beacon identifier and the type and/or identity of the object or vehicle. In this regard, the object associated with the beacon may be classified based on the type of vehicle and/or vessel, the type of cargo, the size of the vehicle and/or vessel, and/or the amount of persons associated with a particular object. FIG. 4 depicts a table 400 listing an exemplary categorization scheme for the target objects in accordance with one embodiment. As shown, the objects may be classified based on the type of vehicle and/or vessel (e.g., maritime, aircraft, military, terrestrial), the type of cargo, the size of the vehicle and/or vessel, and/or the amount of persons (or passengers) associated with a particular object. For example, a first category (M1) may apply to maritime vessels comprising bulk carries, passenger ships, cruise ships, naval ships, and the like. A second category (M2) may apply to maritime vessels comprising cargo carriers, such as chemical carriers, tankers, gas carriers, and the like. A third category (M3) may apply to maritime vessels comprising fishing vessels, river boats, high-speed craft, and other smaller watercraft. A fourth category (A) may apply to aircraft, a fifth category (MIL) may apply to military beacons, a sixth category (P) may apply to persons or personal locator beacons (PLBs), and a seventh category (G) may apply to ground stations, buildings, or other ground based beacons. It should be appreciated that the table 400 in FIG. 4 is presented for purposes of explanation, and is not intended to limit the scope of the subject matter to any particular classification scheme.

In an exemplary embodiment, in response to identifying the object type for the target object, the SAR display process 300 renders a graphical representation of the target object using a symbology representative (or indicative) of the identified object type, as described in greater detail below. For example, a maritime object (M1, M2, or M3) may be rendered in the shape of a ship or boat, with a different size depending on the classification, an aircraft (A) may be rendered with the shape of a plane, a person (P) may be rendered with the shape of a person, a ground station (G) with the shape of a building, and so on. It should be appreciated in the art that the symbology provided herein is for explanatory purposes, and is not intended to limit the subject matter in any way.

In accordance with one embodiment, the SAR display process 300 may identify and/or determine the number of persons associated with the target object. In response, the SAR display process 300 may render the symbology representing the target object using a first visually distinguishable characteristic based on the number of persons associated with the object, as described in greater detail below. In a similar manner, the SAR display process 300 may identify and/or determine the type of cargo associated with the target object, and in response, render the symbology representing the target object using a second visually distinguishable characteristic based on the type of cargo associated with the target object. In accordance with another embodiment, the SAR display process 300 may identify geographic data for the location of the target object, such as, for example, the altitude or depth of sea level at the identified location. In response, the SAR display process 300 may render the symbology representing the target object using a third visually distinguishable characteristic based on the geographic data for the location of the target object.

Referring now to FIG. 3 and FIG. 2, with continued reference to FIG. 1, in an exemplary embodiment, the SAR display process 300 continues by rendering a graphical representation of the target object on the display device (task 310). The target object is preferably rendered overlying the terrain for a region proximate the current location of the aircraft in accordance with the location data, such that the graphical representation of the target object accurately reflects the real-world positioning of the target object relative to the current location and/or heading of the aircraft. In an exemplary embodiment, the graphical representation of the target object is rendered using a symbology with a size and/or shape based on the object type and a visually distinguishable characteristic based on one or more rescue criteria, as described above. For example, as shown in FIG. 2, a first target object 208, 214 is identified as a type corresponding to the first category of objects (e.g., MD, and rendered using a symbology indicative of a large maritime vessel. As shown, a graphical representation of the object 208, 214 is rendered both in the primary flight display 202 and the lateral map display 204. In both displays 202, 204, the object 208, 214 is positioned according to the location data identified above (e.g., task 304), such that the graphical representation of the object 208, 214 within the respective display 202, 204 accurately reflects the real-world positioning of the object 208, 214 relative to the current location and/or heading of the aircraft 114, 212. In this manner, the symbology representing the object 208 may be rendered in a synthetic perspective view in a conformal manner and overlying the terrain 206. In a similar manner, a second target object 210, 216 is identified as the first category of objects (e.g., MD, and rendered using a symbology indicative of a large maritime vessel and positioned in the displays 202, 204 in a manner that accurately reflects the approximate real-world positioning of the object 210, 216 relative to the aircraft 114, 212. In an exemplary embodiment, if the a target object is outside the field of view for the flight deck viewpoint, the SAR display process 300 may display and/or render a graphical feature, such as an arrow, on the boundary of the perspective field of view 202 that is positioned and/or oriented based on the bearing of the target object relative to the aircraft, such that it points and/or indicates the direction of the target object relative to the current aircraft heading.

In addition, in an exemplary embodiment, the SAR display process 300 renders the symbology for a target object using one or more visually distinguishable characteristics based on one or more additional rescue criteria identified for the target object (e.g., task 308). In this regard, the visually distinguishable characteristic(s) is chosen to convey a particular level of urgency for a particular target object. Depending on the embodiment, the visually distinguishable characteristic may be realized by using one more of the following: color, hue, tint, brightness, graphically depicted texture or pattern, contrast, transparency, opacity, animation (e.g., strobing, flickering or flashing), and/or other graphical effects. For example, if the target object is associated with a maritime vessel carrying a high number of passengers or potentially hazardous cargo, the symbology may be rendered using a color, such as red, that indicates a greater urgency than another object (e.g., an unmanned vessel) which may be rendered using a different color, such as amber, to indicate lesser urgency. Similarly, another visually distinguishable characteristic may be used to indicate other rescue criteria. For example, if the depth of sea level is greater than a particular threshold value (e.g., deeper than a threshold value) for the location of a targeted maritime vessel, the symbology for the targeted vessel may be rendered using a visually distinguishable characteristic (e.g., flashing or strobing) to indicate a greater urgency than a targeted vessel in shallower water. In this regard, as shown in FIG. 2, the symbology for the first object 208, 214 is rendered using a first visually distinguishable characteristic and the symbology for the second object 210, 216 is rendered using a second visually distinguishable characteristic, indicating a greater sense of urgency for the second object 210, 216. It should be appreciated that the subject matter is not intended to be limited to any particular visually distinguishable characteristics, and the exact rendering scheme may vary for any given embodiment.

In an exemplary embodiment, the SAR display process 300 continues by displaying the navigational parameters (e.g., from task 306) for the target object on the display device (task 312). In an exemplary embodiment, the navigational parameters are displayed proximate the graphical representation of the target object, however, in other embodiments, the positioning of the navigational parameters may vary depending on human factors and other concerns. For example, as shown in FIG. 2, the range (or distance between the current location of the aircraft and the approximate real-world location of the target object) is displayed proximate the first object 208 (e.g., eighteen nautical miles) along with the bearing relative to the current aircraft heading (e.g., twenty degrees). In a similar manner, the distance and bearing are displayed proximate the second object 210 in the primary flight display 202. The navigational parameters are particularly useful in situations where the target object is located in a region with little or no landmarks or distinguishing geographic features, such as, for example, when the target object is a vessel in open ocean. By displaying the range and bearing of the target object relative to the current location of the aircraft, the target object may be more easily located, particularly when experiencing conditions of low visibility.

In an exemplary embodiment, the SAR display process 300 also displays identified rescue criteria (e.g., from task 308) for the target object on the display device (task 314). Similarly, in the illustrated embodiment, the rescue criteria are displayed proximate the graphical representation of the target object, however, in other embodiments, the positioning of the rescue criteria may vary depending on human factors and other concerns. For example, as shown in FIG. 2, the object type (M1) is displayed proximate the first object 208 in the primary flight display 202 along with the depth of sea level (e.g., one hundred twenty feet) for the location of the object 208. In a similar manner, the object type (M1) and depth of sea level (e.g., one hundred fifteen feet) are displayed proximate the second object 210 in the primary flight display 202. It should be noted that the navigational parameters and rescue criteria are not displayed in the lateral map display 204 due to the scale of the lateral map display 204, however, in practical embodiments, the SAR display process 300 may be modified or otherwise adapted to display the navigational parameters and rescue criteria in the lateral map display, as will be appreciated in the art.

Figure 5:
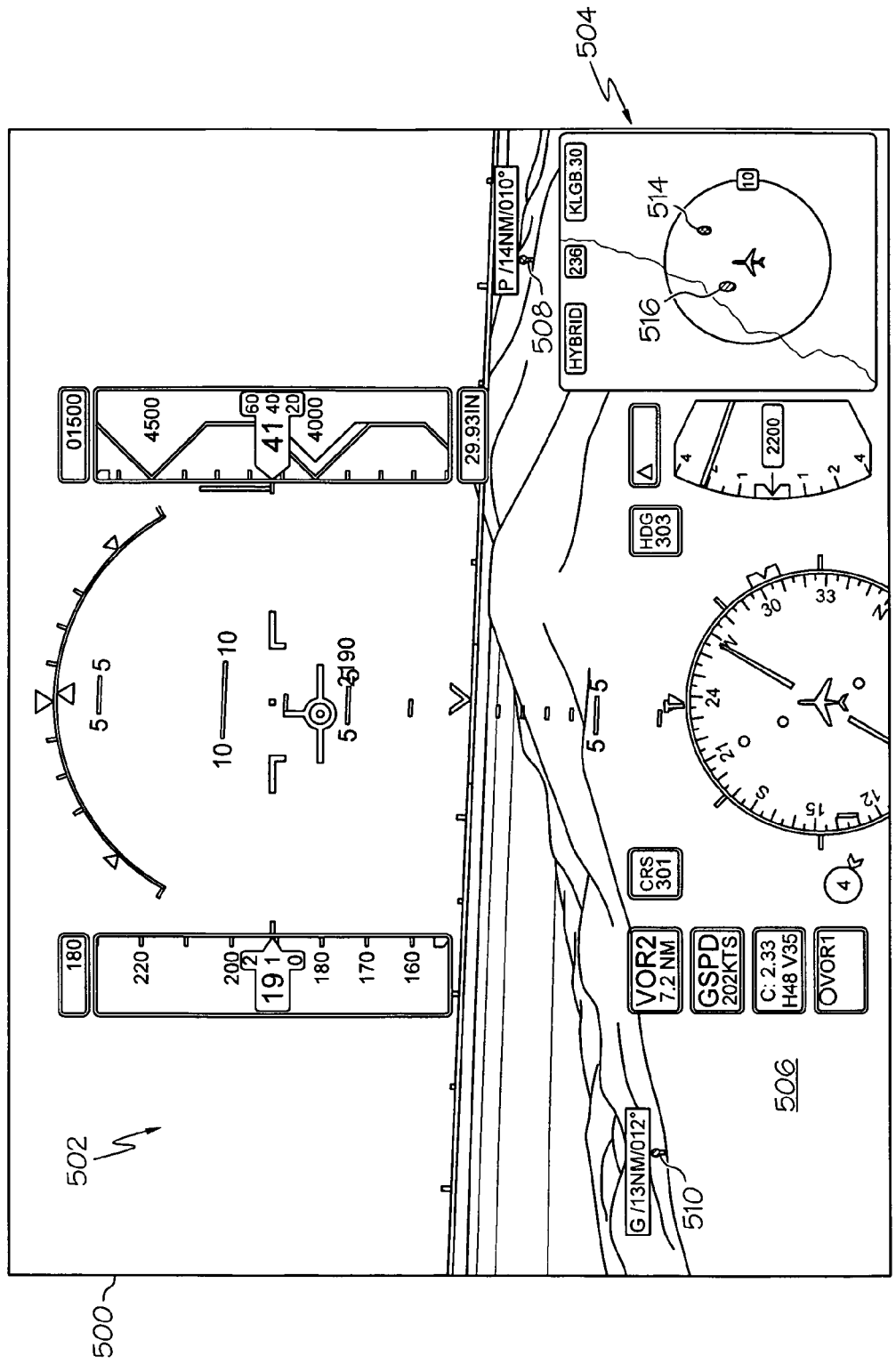
FIG. 5 is an exemplary flight deck display suitable for use with the search and rescue display process of FIG. 3 in accordance with one embodiment.

Referring now to FIG. 5, and with continued reference to FIGS. 1-4, it should be appreciated that although FIG. 2 illustrates the use of the SAR display process 300 for a maritime environment, the SAR display process 300 may also be used with a flight deck display 500 for terrestrial environments and/or non-maritime SAR operations. In this embodiment, the flight deck display 500 includes a primary flight display 502 and a lateral map display 504. It should be appreciated that flight deck display 500 as depicted in FIG. 5 is similar to the flight deck display 200 described in the context of FIG. 2, and the common features and/or elements will not be redundantly described in detail here in the context of FIG. 5.

In the illustrated embodiment, primary flight display 502 includes a synthetic perspective view of terrain 506 and a graphical representation of two target objects 508, 510. As shown, the first target object 508 corresponds to a personal locator beacon or person (e.g., object type P) and the second target object 510 corresponds to a ground based beacon (e.g., object type G). The symbology of each respective object 508, 510 is positioned within the primary flight display 502 and rendered overlying the terrain 506 in a manner that reflects the approximate real-world location of the target object in a similar manner as described above. The terrain 506 for a region proximate the aircraft is rendered in a perspective or three dimensional view that corresponds to a flight deck (cockpit) viewpoint, and the terrain 506 is rendered in a conformal manner relative to the earth, with the symbology representative of the objects 508, 510 being rendered in a conformal manner relative to the terrain 506. As shown, the symbology for the first object 508 (e.g., a person) is rendered using a visually distinguishable characteristic (e.g., the color red) that indicates a greater urgency than for the second object 510. The respective navigational parameters (e.g., distance and bearing) for the objects 508, 510 along with the respective object types are displayed proximate each respective object 508, 510 in a similar manner as described above. It should be appreciated that the lateral map display 504 may also be modified to display graphical representations 514, 516 of the objects 508, 510 in a similar manner as described above in the context of FIG. 2 and FIG. 3.

To briefly summarize, the methods and systems described above allow an aircraft operator (e.g., a pilot and/or crew member) to navigate to a target object and locate the target object using the flight deck display. By rendering a graphical representation of the target object overlying the terrain in a manner that accurately reflects the real-world location of the target object, the situational awareness of the aircraft operator is improved and the aircraft operator can more easily navigate the aircraft to the appropriate location and conduct the search in rough weather conditions (e.g., low visibility). The target object may also be rendered using symbology that provides relevant rescue information (e.g., rescue criteria) to the aircraft operator in a quick and intuitive fashion. In addition, the relevant navigational parameters and/or rescue criteria may be displayed proximate the symbology. The workload on the aircraft operator and others involved in the SAR is reduced, thereby improving the effectiveness of SAR operations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for displaying information on a display device associated with an aircraft, the method comprising:
    rendering a primary flight display on the display device, wherein the primary flight display comprises a synthetic perspective view of terrain for a region proximate a current location of the aircraft, and wherein the synthetic perspective view of terrain corresponds to a flight deck viewpoint;
    receiving a locating signal for a target object, the locating signal being based at least in part on a beacon signal emitted by a distress radio beacon associated with the target object, the locating signal comprising identification information for the target object;
    determining an object type for the target object based on the identification information; and
    in response to the locating signal, rendering, in a portion of the primary flight display, a first symbology with a shape representative of the object type for the target object, wherein the first symbology is rendered in a manner that is influenced by the locating signal.

2. The method of claim 1, further comprising determining location data for the target object based on the locating signal, wherein the first symbology is positioned in accordance with the location data.

3. The method of claim 2, further comprising:
    calculating navigational parameters for the target object based on the location data and the current location of the aircraft; and
    displaying the navigational parameters in the primary flight display.

4. The method of claim 1, further comprising displaying a rescue criterion in the primary flight display proximate the first symbology.

5. The method of claim 1, further comprising determining a sea level depth associated with a location of the target object, wherein rendering the first symbology comprises rendering the first symbology using a visually distinguishable characteristic based on the sea level depth.

6. The method of claim 1, further comprising identifying a rescue criterion for the target object based on the identification information, wherein rendering the first symbology comprises rendering the first symbology using a visually distinguishable characteristic based on the rescue criterion.

7. The method of claim 6, wherein the rescue criterion comprises a number of persons associated with the target object, a type of cargo associated with the target object, an amount of cargo associated with the target object, an altitude at a location of the target object, or a sea level depth at a location of the target object.

8. The method of claim 1, wherein the distress radio beacon comprises a personal locator beacon, an emergency locator transmitter, or an emergency position-indicating radio beacon.

9. A display system for an aircraft, the display system comprising:
    a display device;
    a communications system;
    a flight management system coupled to the communications system, the flight management system and the communications system being cooperatively configured to:
        obtain a locating signal for a target object, the locating signal being based at least in part on a beacon signal emitted by a distress radio beacon associated with the target object, the locating signal including identification information related to the target object based on a beacon identifier obtained from the beacon signal; and
        determine an object type for the target object based on the identification information; and
    a graphics system coupled to the flight management system and the display device, wherein the graphics system and the flight management system are cooperatively configured to:
        render a primary flight display on the display device, wherein the primary flight display comprises a synthetic perspective view of terrain for a region proximate a current location of the aircraft, and wherein the synthetic perspective view of terrain corresponds to a flight deck viewpoint;
        obtain location data for the target object based on the locating signal; and
        render, in a portion of the primary flight display, a first symbology with a shape representative of the object type, wherein the first symbology is positioned in accordance with the location data.

10. The display system of claim 9, wherein the first symbology is rendered in a conformal manner relative to the synthetic perspective view of terrain.

11. The display system of claim 9, wherein the flight management system is configured to determine a rescue criterion for the target object, wherein the first symbology is rendered using a visually distinguishable characteristic based on the rescue criterion.

12. The display system of claim 9, further comprising a database maintaining an association between the beacon identifier and the object type.

13. The method of claim 9, wherein the distress radio beacon comprises a personal locator beacon, an emergency locator transmitter, or an emergency position-indicating radio beacon.

14. A method for displaying information on a display device associated with an aircraft, the method comprising:
rendering a synthetic perspective view of terrain on the display device, the synthetic perspective view of terrain being based on a set of terrain data corresponding to a region proximate the aircraft;
obtaining location data for an object, the location data being based at least in part on a beacon signal emitted by a distress radio beacon associated with the object;
determining an object type for the object based on a beacon identifier obtained from the beacon signal; and
rendering a graphical representation of the object on the display device using a symbology with a shape representative of the object type, wherein the symbology overlies the synthetic perspective view of terrain and is positioned in accordance with the location data.

15. The method of claim 14, wherein:
the synthetic perspective view of terrain comprises a three-dimensional conformal view of terrain based on the set of terrain data; and
rendering the graphical representation of the object comprises rendering the symbology in a conformal manner with respect to the synthetic perspective view of terrain.

16. The method of claim 14, further comprising:
determining navigational parameters for navigating to the object based on the location data and a current location of the aircraft; and
displaying the navigational parameters on the display device overlying the synthetic perspective view of terrain proximate the symbology.

17. The method of claim 14, further comprising identifying a rescue criterion for the object, wherein rendering the graphical representation of the object further comprises rendering the symbology using a visually distinguishable characteristic based on the rescue criterion.

18. The method of claim 17, wherein identifying the rescue criterion comprises determining a sea level depth based on the location data, wherein the first visually distinguishable characteristic is based on the sea level depth.

19. The method of claim 14, wherein determining the object type comprises identifying the object type based on an association between the beacon identifier and the object type maintained in a database.

20. The method of claim 14, further comprising:
rendering a lateral map display on the display device concurrently to rendering the synthetic perspective view of terrain, the lateral map display corresponding to a second region proximate the aircraft and including an aircraft symbol; and
rendering a second graphical representation of the object on the lateral map display using a second symbology representative of the object type, wherein the second symbology is positioned relative to the aircraft symbol in accordance with the location data.

21. A method for displaying information on a display device associated with an aircraft, the method comprising:
rendering a primary flight display on the display device, wherein the primary flight display comprises a synthetic perspective view of terrain for a region proximate a current location of the aircraft, and wherein the synthetic perspective view of terrain corresponds to a flight deck viewpoint;
receiving a locating signal for a target object, the locating signal being based at least in part on a beacon signal emitted by a ground based beacon associated with the target object, the locating signal comprising identification information for the target object;
determining an object type for the target object based on the identification information; and
in response to the locating signal, rendering, in a portion of the primary flight display, a first symbology with a shape representative of the object type for the target object, wherein the first symbology is rendered in a manner that is influenced by the locating signal.

* * * * *